(12) United States Patent
Kubo et al.

(10) Patent No.: US 10,393,240 B2
(45) Date of Patent: Aug. 27, 2019

(54) GEAR DRIVE DEVICE

(71) Applicant: KABUSHIKI KAISHA TOKAI RIKA DENKI SEISAKUSHO, Aichi (JP)

(72) Inventors: Yuki Kubo, Aichi (JP); Seiji Ishigaki, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 285 days.

(21) Appl. No.: 15/462,193

(22) Filed: Mar. 17, 2017

(65) Prior Publication Data
US 2017/0276219 A1 Sep. 28, 2017

(30) Foreign Application Priority Data
Mar. 23, 2016 (JP) ................................. 2016-058379

(51) Int. Cl.
*F16H 19/00* (2006.01)
*F16H 55/08* (2006.01)
*F16H 19/08* (2006.01)
*F16H 55/17* (2006.01)

(52) U.S. Cl.
CPC .......... *F16H 19/001* (2013.01); *F16H 19/08* (2013.01); *F16H 55/0806* (2013.01); *F16H 55/0886* (2013.01); *F16H 55/17* (2013.01); *F16H 2019/008* (2013.01)

(58) Field of Classification Search
CPC .... F16H 19/001; F16H 19/08; F16H 55/0806; F16H 55/0886
See application file for complete search history.

(56) References Cited

U.S. PATENT DOCUMENTS

| 3,661,031 A | * | 5/1972 | Mizukoshi | B62D 3/08 74/462 |
| 3,882,735 A | | 5/1975 | Shimodaira et al. | |
| 4,184,380 A | * | 1/1980 | Rivin | F16H 55/06 74/461 |
| 4,663,982 A | | 5/1987 | Nihira | |

(Continued)

FOREIGN PATENT DOCUMENTS

| JP | 54-148949 A | 11/1979 |
| JP | 4-28256 U | 3/1992 |

(Continued)

OTHER PUBLICATIONS

Office Action issued in the corresponding Japanese application No. 2016-058379 dated Feb. 14, 2017.

(Continued)

*Primary Examiner* — David M Fenstermacher
(74) *Attorney, Agent, or Firm* — Robert Mlotkowski Safran Cole & Calderon, P.C.

(57) ABSTRACT

A gear drive device includes a first gear, a second gear that meshes with the first gear to allow torque transmission, and a biasing member that applies rotational torque in one direction to the first gear or the second gear. The first gear and the second gear are brought into contact at a contacting tooth surface thereof by the biasing member. At least one of the first gear and the second gear includes a non-contacting tooth surface that is on an opposite side of the contacting tooth surface and partially removed.

6 Claims, 5 Drawing Sheets

(56) References Cited

U.S. PATENT DOCUMENTS

| | | | | |
|---|---|---|---|---|
| 4,911,032 A * | 3/1990 | Steele | ............... | F16D 41/00 |
| | | | | 188/82.1 |
| 5,259,262 A * | 11/1993 | DuRocher | ............ | B60Q 1/1469 |
| | | | | 200/61.54 |
| 2002/0134184 A1* | 9/2002 | Hawkins | ................ | F16H 55/08 |
| | | | | 74/457 |
| 2007/0137355 A1* | 6/2007 | Ohmi | ................ | F16H 55/0886 |
| | | | | 74/462 |
| 2007/0227279 A1* | 10/2007 | Watanabe | ............ | B62D 5/0409 |
| | | | | 74/89.14 |
| 2010/0269617 A1* | 10/2010 | Eitzinger | ................ | B05D 3/12 |
| | | | | 74/457 |
| 2011/0203397 A1* | 8/2011 | Bishop | ................... | F16H 55/18 |
| | | | | 74/437 |

FOREIGN PATENT DOCUMENTS

| | | | |
|---|---|---|---|
| JP | 2005-003144 A | 1/2005 | |
| JP | 2014-233452 A | 12/2014 | |

OTHER PUBLICATIONS

Extended European Search Report issued in the corresponding EP application No. 17162452.1 dated Sep. 25, 2017.

\* cited by examiner

GEAR DRIVE DEVICE

The present application is based on Japanese patent application No. 2016-058379 filed on Mar. 23, 2016, the entire contents of which are incorporated herein by reference.

TECHNICAL FIELD

The present invention relates to a gear drive device.

BACKGROUND ART

A gear drive device is known in which a first gear and a second gear are installed with a meshing position of the second gear with respect to the first gear fixed at a predetermined phase (see for example Patent Document 1).

The gear drive device described in Patent Document 1 includes jigs extending beside and parallel to a first shaft and a second shaft of a back case. Inserting the jigs through positioning holes and the like and installing (supporting) the gears in order on the first shaft and the second shaft allows the rotational positions (phase, mesh position) of the gears to be fixed with respect to the back case.

Additionally, a rack and pinion gear drive device is known that effectively prevents interference between the teeth of the rack and the teeth of the pinion (see for example Patent Document 2).

In the gear drive device described in Patent Document 2, the rack teeth aligned in the shaft longitudinal direction are formed in a tooth profile via cut processing of the outer surface of the rack shaft. Thereafter, the edges on both sides of the tooth tip portions in the thickness direction and the edges of the tooth profile formed at both ends in the tooth trace direction are chamfered. The chamfered portion of at least the edge proximal to the tooth tip has a suitable roundness. Accordingly, interference with the pinion teeth can be effectively prevented and thus durability can be improved.

CITATION LIST

Patent Document

Patent Document 1: Japanese Unexamined Patent Application Publication No. 2014-233452A Patent Document 2: Japanese Unexamined Patent Application Publication No. 2005-003144A

SUMMARY OF INVENTION

Technical Problem

In such gear drive devices, the inter-axial distance between the paired gears is preferably the sum of the two pitch diameters. However, considering the tolerance of the inter-axial distance and the tolerance of the gears, the inter-axial distance set to the sum of the pitch diameters may cause, when tolerance is at its worst, interference between the teeth. When the inter-axial distance is further increased, the gears do not come into contact with one another on an involute curve. This prevents smooth mesh of the gears and thus prevents smooth transmission.

It is an object of the present invention to provide a gear drive device that prevents the occurrence of the interference even when the inter-axial distance is decreased.

Solution to Problem

[1] According to an embodiment of the invention, a gear drive device comprises:
a first gear;
a second gear that meshes with the first gear to allow torque transmission; and
a biasing member that applies rotational torque in one direction to the first gear or the second gear,
wherein the first gear and the second gear are brought into contact at a contacting tooth surface thereof by the biasing member, and
wherein at least one of the first gear and the second gear comprises a non-contacting tooth surface that is on an opposite side of the contacting tooth surface and partially removed.

[2] The gear drive device according to [1] may be configured such that the non-contacting tooth surface is removed so as to maintain torque transmission between the first gear and the second gear.

[3] The gear drive device according to [1] or [2] may be configured such that the non-contacting tooth surface is removed along a line that contacts a tooth root R of a tooth root and extends toward a tooth tip.

[4] The gear drive device according to any one of [1] to [3] may be configured such that the non-contacting tooth surface is formed on a tooth portion in a range where the first gear and the second gear mesh.

[5] The gear drive device according to any one of [1] to [4] may be configured such that at least one of the first gear and the second gear comprises the contacting tooth surface formed with an involute curve.

[6] The gear drive device according to any one of [1] to [5] may be configured such that at least one of the first gear and the second gear comprises a sector gear.

Advantageous Effects of Invention

According to an embodiment of the invention, a gear drive device can be provided that prevents the occurrence of the interference even when the inter-axial distance is decreased.

DESCRIPTION OF EMBODIMENTS

Figure 1:
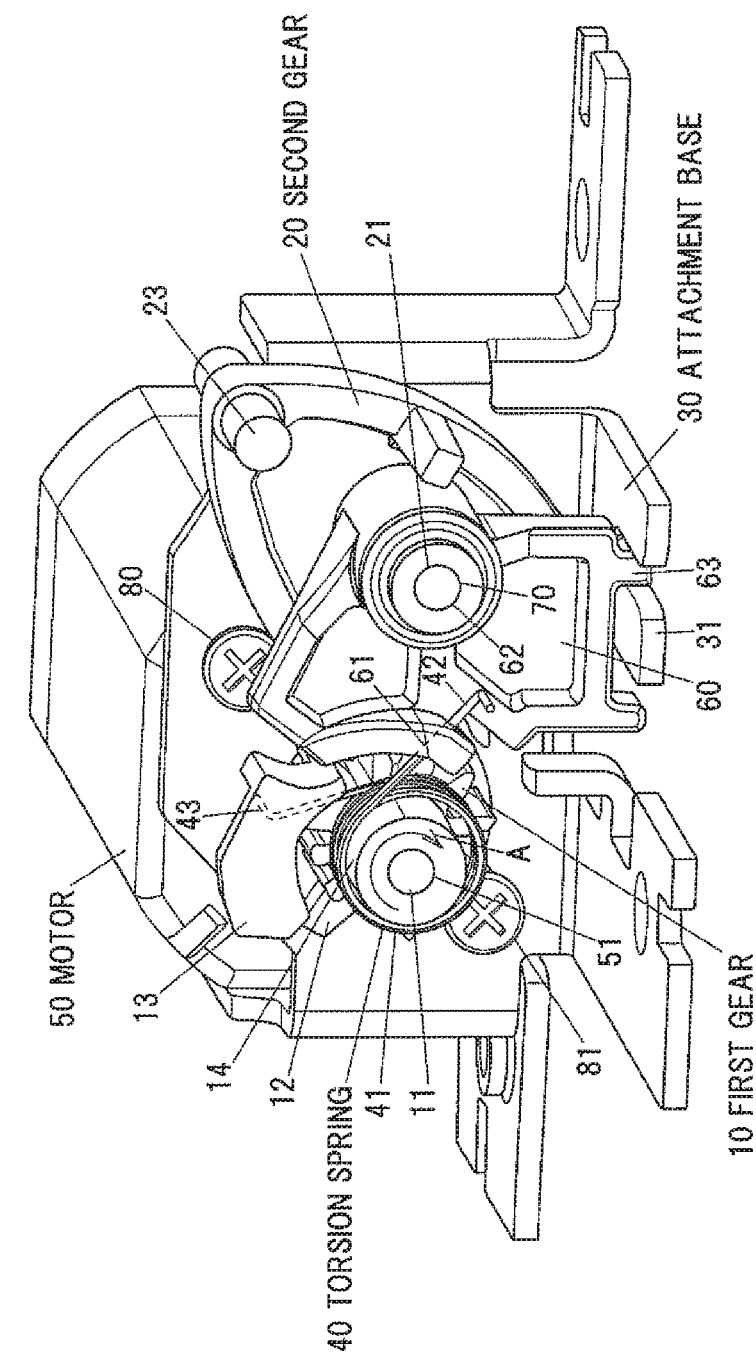
FIG. 1 is a three-dimensional schematic perspective view of a gear drive device according to an embodiment of the present invention.
Figure 2:
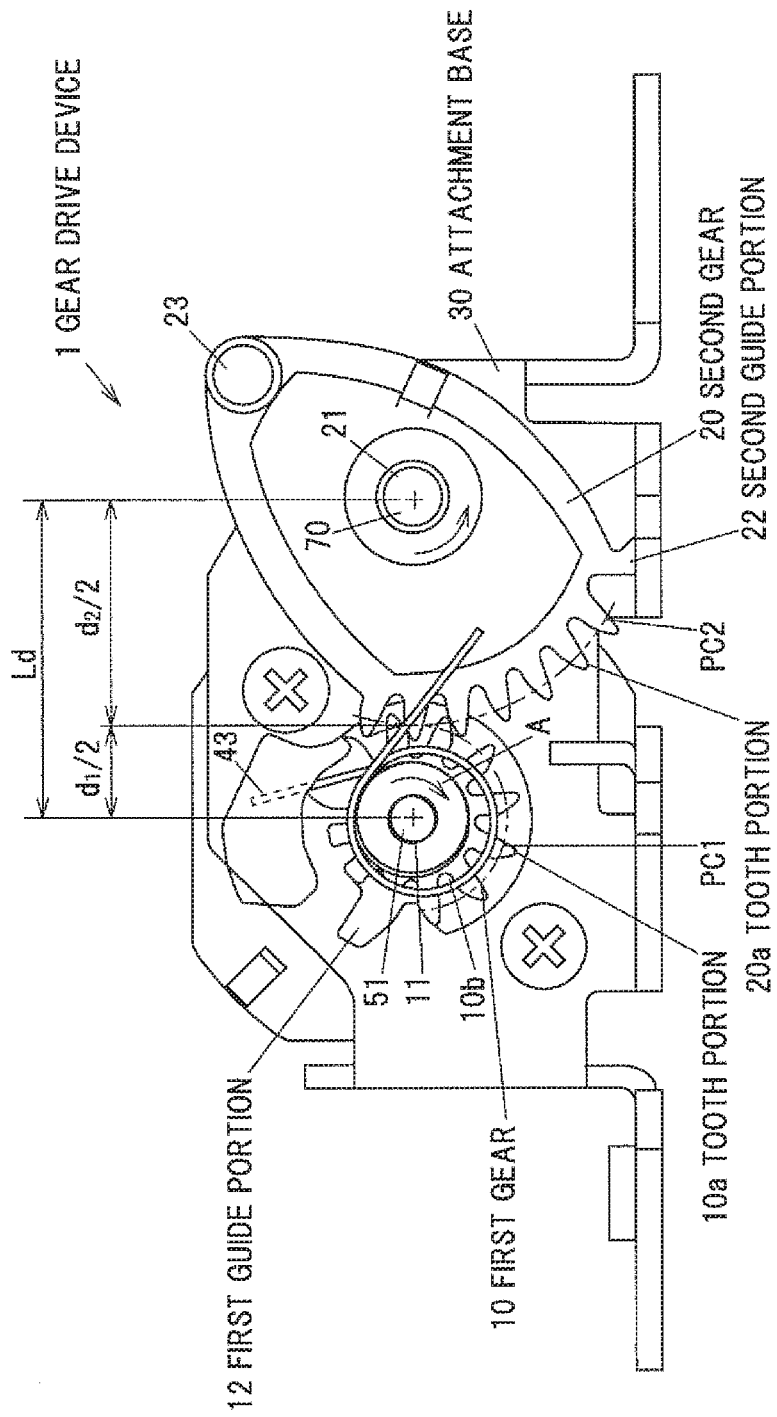
FIG. 2 is a front view of the gear drive device according to the embodiment of the present invention as seen from a gear rotation axis direction.

FIG. 1 is a three-dimensional schematic perspective view of a gear drive device according to an embodiment of the present invention. FIG. 2 is a front view of the gear drive device according to the embodiment of the present invention as seen from a gear rotation axis direction. Below, preferred embodiments of the present invention are described in detail while referencing the drawings.

Embodiments of Present Invention

Overall Configuration of Gear Drive Device 1

A gear drive device 1 according to the present embodiment includes a first gear 10, a second gear 20 in mesh with the first gear 10 to allow torque transmission, and a torsion spring 40, which is a biasing member that applies rotational torque in one direction to the first gear 10 or the second gear 20. In the gear drive device 1, the first gear 10 and the second gear 20 are brought into contact with one another at contacting tooth surfaces thereof by the torsion spring 40, and a non-contacting tooth surface of the first gear 10 and/or the second gear 20 on the opposite side of the contacting tooth surfaces is partially cut out.

First Gear 10

The first gear 10, as illustrated in FIGS. 1 and 2 is a spur gear with an involute curve tooth profile and is made of resin such as polyoxymethylene (POM) also called polyacetal, for example.

The first gear 10, as illustrated in FIG. 2, is a sector gear that includes tooth portions (projecting portions of the teeth) 10a only around a predetermined range of a pitch circle PC1.

An attachment hole portion 11 is disposed in the rotation center of the first gear 10, and a motor shaft 51 of a motor 50 is attached to the attachment hole portion 11. The attachment hole portion 11 and the mating motor shaft 51 are integrally joined in a manner not allowing for rotation relative to one another. This configuration causes the rotation of the motor 50 to rotate the first gear 10.

Second Gear 20

The second gear 20, as illustrated in FIGS. 1 and 2 is a spur gear with an involute curve tooth profile and is made of resin such as polyoxymethylene (POM) also called polyacetal, for example.

The second gear 20, as illustrated in FIG. 2, is a sector gear that includes tooth portions (projecting portions of the teeth) 20a only around a predetermined range of a pitch circle PC2.

An attachment hole portion 21 is disposed in the rotation center of the second gear 20, and a central shaft 70 projecting from an attachment base 30 is attached to the attachment hole portion 21. The attachment hole portion 21 and the central shaft 70 mate together in a manner allowing for rotation. This configuration allows the second gear 20 to rotate about the center of the attachment hole portion 21 (central shaft 70).

The first gear 10 and the second gear 20 have the same module for the tooth portion, and the distance between the central axes of the first gear 10 and second gear 20 is approximately the sum of $d_1/2$ (half the pitch circle diameter $d_1$) and $d_2/2$ (half the pitch circle diameter $d_2$), as illustrated in FIG. 2. This configuration allows the first gear 10 and the second gear 20 to mesh, as illustrated in FIGS. 1 and 2, and transmit torque.

The second gear 20 driven by the first gear 10 is provided with a drive pin 23 via which a drive target can be driven.

Guide Portion

As illustrated in FIG. 2, the first gear 10 and the second gear 20 are a sector gear. Thus, the first gear 10 and the second gear 20 need to be installed so that their respective specific teeth are paired in the rotation direction. Because of this, the first gear 10 and the second gear 20 are provided with a first guide portion 12 and a second guide portion 22, respectively. The guide portions 12, 22 facilitate the positioning of the first gear 10 and the second gear 20 in the gear rotation direction upon installation.

Figure 3:
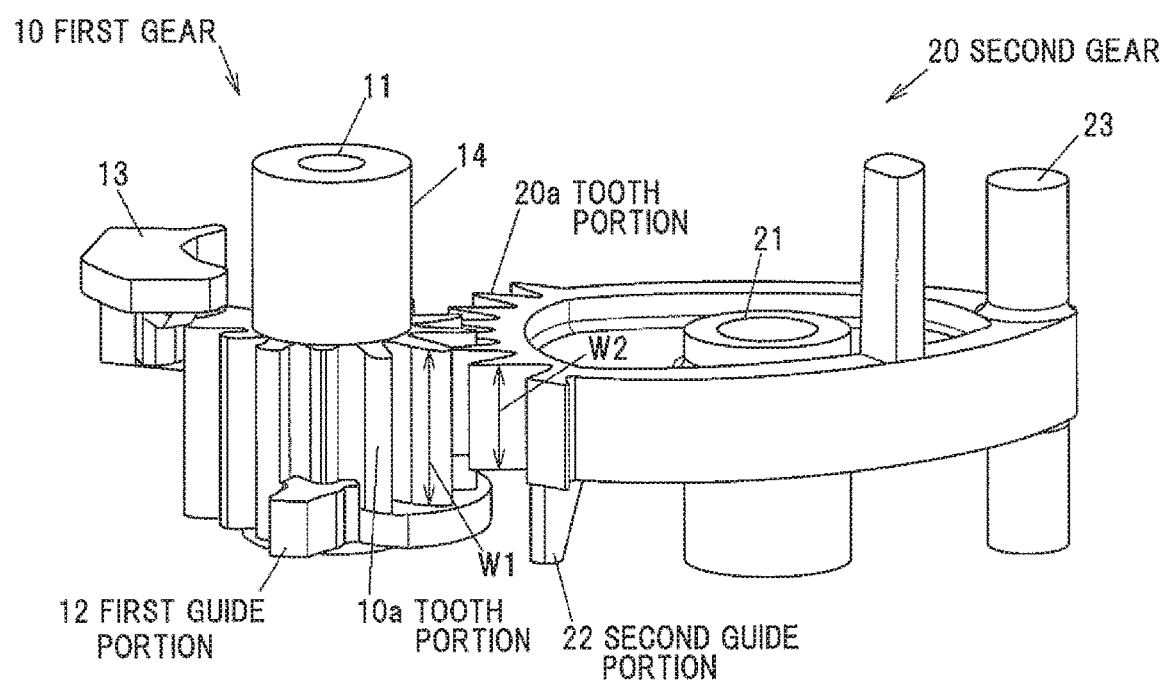
FIG. 3 is a three-dimensional perspective view illustrating the positions of respective guide portions of a first gear and a second gear.

FIG. 3 is a three-dimensional perspective view illustrating the positions of the respective guide portions (the first guide portion 12 and the second guide portion 22) of the first gear and the second gear.

As illustrated in FIG. 3, the first guide portion 12 of the first gear 10 is disposed separate from the tooth portions 10a of the first gear 10. In a similar manner, the second guide portion 22 of the second gear 20 is disposed separate from the tooth portions 20a of the second gear 20.

As illustrated in FIG. 3, the first guide portion 12 described above is disposed at a position spaced apart from the tooth portions 10a in the direction of tooth width W1. In a similar manner, the second guide portion 22 is disposed at a position spaced apart from the tooth portions 20a in the direction of tooth width W2. Accordingly, upon installation of the first gear 10 and the second gear 20, the first guide portion 12 and the second guide portion 22 come into contact with one another at a position spaced apart from the tooth portions 10a, 20a.

Additionally, as illustrated in FIGS. 2 and 3, the first guide portion 12 protrudes from a tooth tip 10b of the first gear 10. This configuration reliably prevents the tooth tips of the first gear 10 and the second gear 20 from coming into contact with one another upon installation.

Attachment Base 30

The attachment base 30, as illustrated in FIGS. 1 and 2, functions as the base of the unit constituted by the gear drive device 1 and supports the first gear 10 and the second gear 20 via the motor 50 and the central shaft 70. For example, stainless steel, treated steel, or the like is subjected to stamping to form the attachment base 30.

Torsion Spring 40

A coil portion 41 of the torsion spring 40, as illustrated in FIGS. 1 and 2, is attached to a boss portion 14 of the first gear 10 and applies a biasing force to the first gear 10 in a predetermined rotation direction (direction A). The torsion spring 40 is made of a spring steel, stainless steel for springs, or the like and includes arm portions 42, 43 extending from opposite ends of the coil portion 41.

As illustrated in FIG. 1, the arm portion 42, which is one of the arm portions of the torsion spring 40, is locked to a locking portion 61 of a block member 60 fixed to the attachment base 30. The other arm portion 43 is locked to a spring locking portion 13 which is a part of the first gear 10. This configuration biases the first gear 10 to rotate in the direction A.

Motor 50

The motor 50, as illustrated in FIGS. 1 and 2, is fixed to the attachment base 30 via screws 80, 81 with the motor shaft 51 protruding to the side on which the first gear 10 is located. Examples of motors that can be used for the motor 50 include a brush DC motor, a brushless DC motor, and the like.

Block Member 60

As illustrated in FIG. 1, the central shaft 70 is inserted in an attachment hole portion 62 and a leg portion 63 is locked in a notch portion 31 of the attachment base 30, resulting in the block member 60 being fixed to the attachment base 30. The block member 60 is made of resin or the like, for example. The block member 60 restricts movement of the second gear 20 in the axial direction of the central shaft 70, which prevents the second gear 20 from coming off the central shaft 70. Additionally, the block member 60, as described above, is provided with the locking portion 61 for locking the arm portion 42, which is one of the arm portions, of the torsion spring 40. This configuration allows the first gear 10 to be biased via the torsion spring 40 to rotate in the direction A from the attachment base 30 side.

Installation of First Gear 10 and Second Gear 20

Figure 4A:
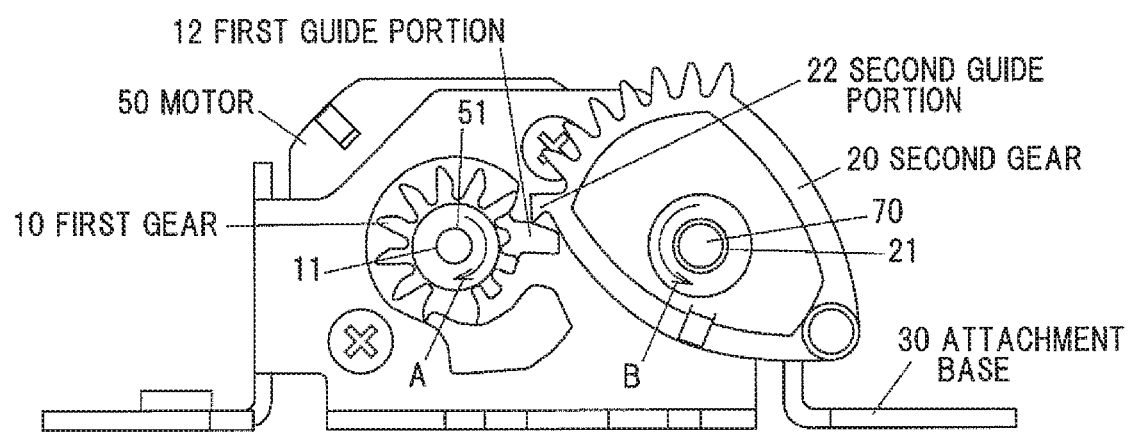
FIGS. 4A to 4C are diagrams illustrating the steps of installing the first gear and the second gear.
Figure 4B:
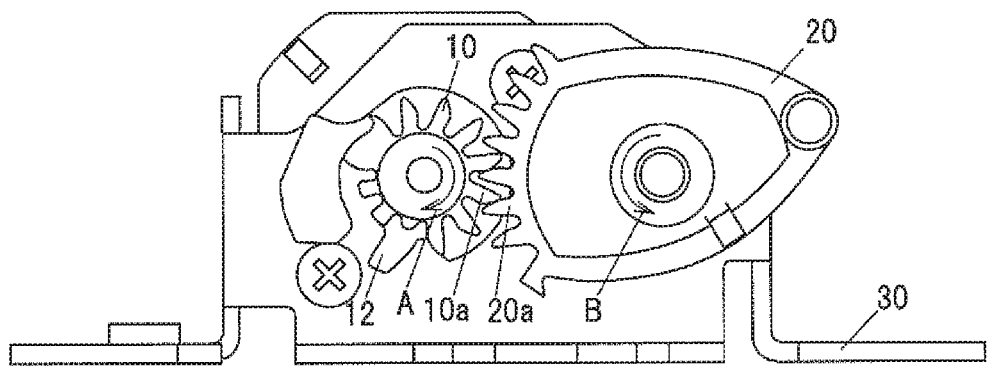
Figure 4C:
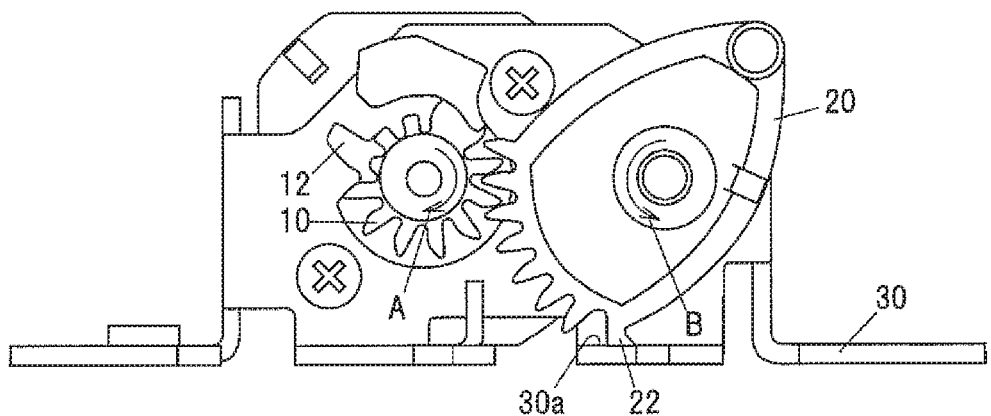

FIGS. 4A to 4C are diagrams illustrating the steps of installing the first gear and the second gear.

FIG. 4A illustrates a state in which the first gear 10 and the second gear 20 are placed at initial positions for installation on the motor 50 attached to the attachment base 30 and the central shaft 70 projecting from the attachment base 30, respectively. The attachment hole portion 11 of the first gear 10 is fitted on the motor shaft 51. Additionally, the attachment hole portion 21 of the second gear 20 is fitted on the central shaft 70. Note that in this state, the torsion spring 40 has yet to be mounted.

At the initial positions prior to installation of the first gear 10 and the second gear 20, as illustrated in FIG. 4A, the first guide portion 12 and the second guide portion 22 are in contact with one another. Note that the initial positions prior to installation of the first gear 10 and the second gear 20 may also be positions at which the first guide portion 12 and the second guide portion 22 are rotated opposite to the direction A and direction B illustrated in FIG. 4A, respectively, so to be spaced apart from one another a predetermined distance.

FIG. 4B is a diagram illustrating a state in which rotating the second gear 20 in the direction B in the state illustrated in FIG. 4A brings the respective specific teeth of the first gear 10 and the second gear 20 in mesh and rotates the first gear 10 in the direction A. In other words, in the state illustrated in FIG. 4A in which the first guide portion 12 and the second guide portion 22 are in contact with one another, the respective specific teeth portions (10a and 20b) of the first gear 10 and the second gear 20 are brought in mesh and the first gear 10 rotates in the direction A following the rotation of the second gear 20 in the direction B.

FIG. 4C illustrates a state in which the second gear 20 rotates further in the direction B so that the second guide portion 22 comes into contact with a plate surface 30a of the attachment base 30. In other words, rotation of the first gear 10 and the second gear 20 is restricted at the positions illustrated in FIG. 4C.

As illustrated in FIGS. 1 and 2, the torsion spring 40 mounted to the first gear 10 biases the first gear 10 in the direction A. This makes the second gear 20 biased in the direction B. Accordingly, after installation in which the torsion spring 40 is mounted to the first gear 10, a state in which the second guide portion 22 is in contact with the plate surface 30a of the attachment base 30 is the post installation state.

The second guide portion 22 includes a positioning function to determine the initial position in the gear rotation direction of the first gear 10 or the second gear 20 after installation. Note that in another embodiment, the first guide portion 12 may include the positioning function to determine the initial position after installation.

Gear Drive Device Transmission Operation

Figure 5A:
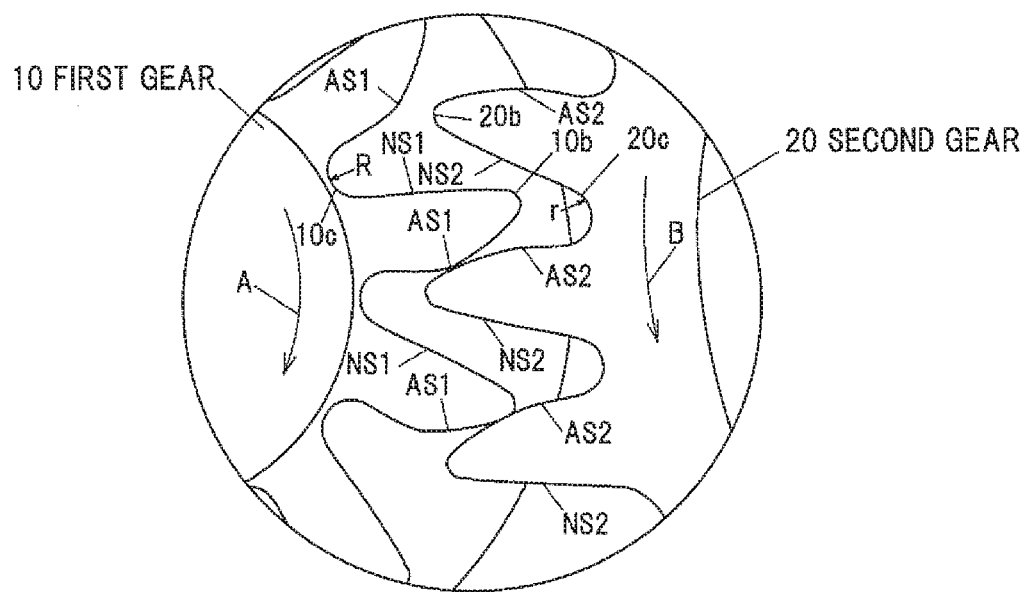
FIG. 5A is a cross-sectional view of a meshing portion of an example tooth profile according to the present embodiment.
Figure 5B:
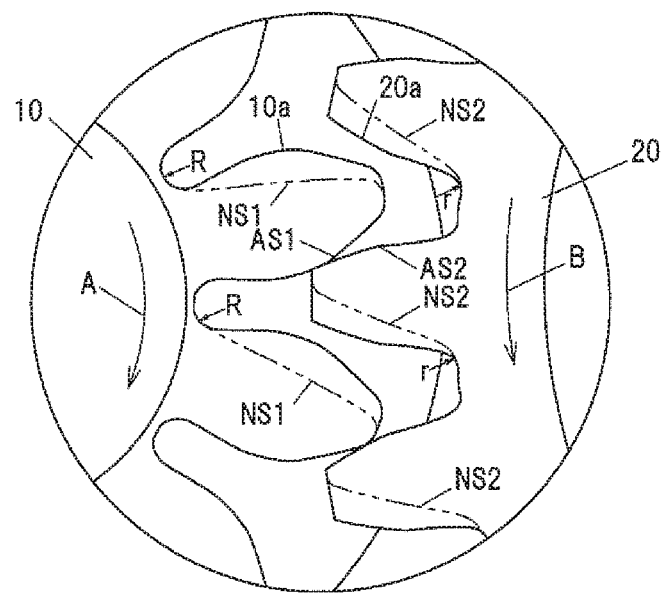
FIG. 5B is a cross-sectional view of a meshing portion of an example typical involute tooth profile for comparison.

FIG. 5A is a cross-sectional view of a meshing portion of an example tooth profile according to the present embodiment. FIG. 5B is a cross-sectional view of a meshing portion of an example typical involute tooth profile for comparison.

In the gear drive device 1 according to the present embodiment, the first gear 10 is biased via the torsion spring 40 to rotate in the direction A, thereby biasing the second gear 20 in the direction B, as illustrated in FIGS. 1 and 2. Accordingly, as illustrated in FIG. 5A, the first gear 10 and the second gear 20 rotate in contact with one another only at their one-side tooth surfaces. In other words, the first gear 10 and the second gear 20 rotate in contact with one another at contacting tooth surfaces AS1, AS2. This applies to both a configuration in which the gear drive device 1 is driven by the motor 50 illustrated in FIGS. 1 and 2 and a configuration in which the gear drive device 1 is driven via the drive pin 23.

As illustrated in the comparative example of FIG. 5B, consider how when typical gears mesh, the first gear 10 rotates in the direction A and the second gear 20 rotates in the direction B, and the first gear 10 and the second gear 20 rotate in contact with one another at the contacting tooth surfaces AS1, AS2. In the configuration illustrated in FIG. 5B, a non-contacting tooth surface NS1 of the first gear 10 that does not come into contact with the opposing contacting tooth surface AS1 can be partially cut out in advance to the degree that torque transmission between the first gear 10 and the second gear 20 can be maintained and the strength of the gears is not affected.

In other words, the non-contacting tooth surface NS1 is formed along the line (long dashed double-short dashed line) extending from a valley portion R toward the tooth tip 10b of the involute tooth profile illustrated in FIG. 5B, which results in the tooth portion 10a being cut out. Accordingly, as illustrated in FIG. 5A, a tooth profile can be obtained with the contacting tooth surface having an involute profile and the non-contacting tooth surface NS1 having a cut surface profile. The tooth portions in the range where the first gear 10 and the second gear 20 mesh have these tooth profiles.

Similarly, in the configuration illustrated in FIG. 5B, a non-contacting tooth surface NS2 of the second gear 20 that does not come into contact with the opposing contacting tooth surface AS2 can be cut in advance to the degree that torque transmission between the first gear 10 and the second gear 20 can be maintained and the strength of the gears is not affected. In other words, the non-contacting tooth surface NS2 is formed along the line (long dashed double-short dashed line) extending from a valley portion r toward the tooth tip 20b of the involute tooth profile illustrated in FIG. 5B, which results in the tooth portion 20a being cut out. Accordingly, as illustrated in FIG. 5A, a tooth profile can be obtained with the contacting tooth surface having an involute profile and the non-contacting tooth surface NS2 having a cut surface profile. The tooth portions in the range where the first gear 10 and the second gear 20 mesh have these tooth profiles.

As described above, cutting the non-contacting tooth surface of the first gear 10 and/or the second gear 20 can prevent interference between gears. This allows the inter-axial distance Ld to be set to the sum of the pitch diameters (the sum of $d_1/2$ (half the pitch circle diameter $d_1$) and $d_2/2$ (half the pitch circle diameter $d_2$) illustrated in FIG. 2, which makes transmission smooth. As a result, the gear drive device can have a configuration in which the gears do not interfere with one another even when the inter-axial distance is decreased.

Effect of Embodiments

A gear drive device according to embodiments of the present invention has the following effects.

(1) The gear drive device according to the present embodiment includes the first gear 10 and/or the second gear 20 with the non-contacting tooth surface of the first gear 10 and/or the non-contacting tooth surface of the second gear 20 partially cut out. This configuration prevents the gears from interfering with one another even when the inter-axial distance is decreased.

(2) Interference between the gears is unlikely to occur even if inter-axial distance between the gears is affected by the tolerance of the first gear 10 and the second gear 20 and the precision of the distance between the centers of the motor shaft 51 and the central shaft 70.

(3) The gear drive device does not require measures such as setting the inter-axial distance larger by a predetermined amount or shifting the gears in advance to prevent interference of the gears.

As made clear above, the invention according to the scope of the claims is not limited by the representative embodiments, modified examples, and illustrated examples according to the present invention described above. As such, it should be understood that all combinations of the features described in the embodiments, modified examples, and illustrated examples are not required parts of the means to solve the problem of the invention.

What is claimed is:

1. A gear drive device, comprising:
   a first gear;
   a second gear that meshes with the first gear to allow torque transmission;
   a driving mechanism that applies a driving torque to the first and second gears, and
   a biasing member separate from the driving mechanism that applies rotational torque in one direction to the first gear or the second gear,
   wherein the first gear and the second gear are brought into contact at a contacting tooth surface thereof by the biasing member, and
   wherein at least one of the first gear and the second gear comprises a non-contacting tooth surface that is on an opposite side of the contacting tooth surface and partially removed.

2. The gear drive device according to claim 1, wherein the non-contacting tooth surface is removed so as to maintain torque transmission between the first gear and the second gear.

3. The gear drive device according to claim 1, wherein the non-contacting tooth surface is removed along a line that contacts a tooth root R of a tooth root and extends toward a tooth tip.

4. The gear drive device according to claim 1, wherein the non-contacting tooth surface is formed on a tooth portion in a range where the first gear and the second gear mesh.

5. The gear drive device according to claim 1, wherein at least one of the first gear and the second gear comprises the contacting tooth surface formed with an involute curve.

6. The gear drive device according to claim 1, wherein at least one of the first gear and the second gear comprises a sector gear.

* * * * *